Patented Sept. 21, 1926.

1,600,693

UNITED STATES PATENT OFFICE.

HENRY R. MINOR, OF OSSINING, NEW YORK, ASSIGNOR TO GENERAL CARBONIC COMPANY, OF NEW YORK, N. Y., A CORPORATION OF NEW YORK.

METHOD OF CURING MOLDED RUBBER ARTICLES.

No Drawing.   Application filed June 1, 1925. Serial No. 34,216.

This application is in part a continuation of my application, Serial No. 654,564, filed July 30, 1923 (which has since issued as Letters Patent No. 1,554,023, on June 30, 1925), and wherein division was required.

My present invention relates to the curing of rubber articles and has for its object to treat rubber goods in such a way as to preserve them from deleterious action particularly of air. A further object of the invention is to mold rubber articles under conditions of great economy and with a certainty of obtaining uniform and satisfactory results.

In the curing of rubber articles such as automoblie tires or the like, it is the common practice to place the uncured articles within a mold and to exert pressure upon the article so as to force it into firm contact with the inner walls of the mold and to then heat the mold so as to vulcanize the rubber, while the article is maintained under pressure. One of the standard methods of producing the pressure is to use an expansible bag within the mold, said bag being filled with compressed air generally accompanied by moisture which, owing to the heat employed during vulcanization, is converted into steam and thereby increases the pressure. The air bags thus used are generally made of rubber and it has been found that a rubber bag so used will be detrimentally affected by the air and quickly deteriorate.

I have found that in order to avoid the difficulties experienced hitherto, it is necessary that the medium under pressure used for filling the expansible bag, at least during the first or initial cure, be carbon dioxide gas in as substantially pure condition and free from impurities and from moisture. I have discovered that by using carbon dioxide in this condition throughout the vulcanizing or curing process, or at least during the first cure, many advantages are obtained, including long life of the air bag, beneficial action of the carbon dioxide on the article undergoing treatment, and others, some of which were not known or understood hitherto. As an example, I have discovered in this connection that the migration of sulphur on the outside of the expansible bag may be reduced by a proper application of my process and proper use of carbon dioxide reduces the time of vulcanization. It has also been found that carbon dioxide will pass through the walls of a rubber bag more readily than air. When, therefore, a rubber bag placed within a mold is inflated with carbon dioxide, such dioxide will pass to the outside of the rubber bag and partially displace the air contained between the outer surface of the bag and the inner surface of the shoe or tire casing in the mold. During this action, apparently the rubber molecules become surrounded with a film of carbon dioxide which seemingly acts to prevent contact between the sulphur migrating from the shoe and the rubber molecules of the bag. As a consequence, I am enabled to use a bag with much thinner walls in my process than has heretofore been possible. The fact that the bag under these conditions is penetrated by the carbon dioxide gas of the dry and pure character referred to causes the stock of the bag to remain materially stronger than if the same bag were used with moist air. I am thus enabled to save materially by the use of rubber bags much thinner and lighter than those employed hitherto in the process in which the bags are inflated with air. The presence of such carbon dioxide is also beneficial in that the rubber bag is and remains much stronger in the neighborhood of the inflating valve than when air, and particularly moist air, is used as an inflating medium.

The particular apparatus employed for supplying carbon dioxide gas to the interior of the expansible bags is of no material importance to the features of my invention claimed herein. I may, for instance, employ apparatus of the kind illustrated in my earlier application above identified, but I am not confined to the recirculation method.

As a specific instance illustrative of my invention, I may proceed as follows: A proper amount of carbon dioxide is taken from any suitable source of supply and preferably from a much larger supply than is required for filling an individual expansible rubber bag. This is injected into the rubber bag while the latter is within the shoe or casing to be cured. The source of supply is preferably maintained under a substantially constant pressure. The carbon dioxide will penetrate the rubber and if, as is usually the practice in the carrying out of my invention, the walls of such bag are relatively thin, the carbonic gas will pass through in a relatively short time and will therefore not only saturate the rubber of the expansible bag, but will form, as it were, a layer or film between the outer surface of said bag and the inner surface of the casing to be cured. This film excludes any air that may have been previously between the rubber bag and the casing and thereby forming a protective medium for the rubber. It also attacks the migration of sulphur from the casing to the rubber bag, which is therefore preserved in serviceable condition for a much longer time than is usual when the practice of inflating the bag with air is employed. The operation of curing a tire casing is generally performed in a series of successive operations. According to my invention, the inflation of the rubber bag with carbon dioxide may be resorted to during each of the successive curing operations. I have found, however, that quite satisfactory results are obtained in many cases if the filling of the expansible bag with carbon dioxide is employed only during the first curing operation and the subsequent curing operations may be conducted with a filling of compressed air in the expansible bag. This may be accounted for by the fact that during the first curing operation with a filling of carbon dioxide, the expansible bag absorbs a sufficient amount of such gas to protect it from the deleterious effect of the air during the subsequent curing operations if the latter are carried on with a filling of air. I need not describe in detail the heating operations which form part of the curing of the tire, since these may be conducted in substantially the well known manner. By using carbon dioxide during the first curing operation only, a considerable saving in the amount of this agent required may be effected. The expansible bag is maintained in communication with the source of medium under pressure during the application of the vulcanizing heat.

I have found that the amount of carbon dioxide absorbed by rubber is retained by it for a considerable length of time and that such absorbed carbon dioxide has a powerful preservative effect on the rubber. Tires as usually made will be found to deteriorate or age as it is called, owing to the effect of atmospheric air on the rubber. Tires cured according to my invention age much less quickly than the usual tires, since my tires contain a certain amount of carbon dioxide acting as a preservative. This preservative effect may be increased very considerably by storing the finished tires or casings in carbon dioxide or at least in an atmosphere containing a larger percentage of carbon dioxide than atmospheric air. I am aware that atmospheric air normally contains a small proportion of carbon dioxide but this is so small as to have practically no preservative action of the character which my invention enables me to obtain.

After the curing operation conducted with carbon dioxide has been completed, I expeditiously apply suction to remove the carbon dioxide from the expansible bag and return the carbon dioxide thus withdrawn to the source or storage tank from which such carbon dioxide was originally taken. With this procedure, the amount of carbon dioxide required for replenishing is relatively small. The advantages derived by the use of carbon dioxide are that it acts advantageously in quickly curing the rubber and in preserving the rubber when cured. The use of my carbon dioxide method affords also a material saving in rendering possible the use of a thinner air bag, thereby materially reducing the cost of operation, because less material is required for the bag, and on account of the thin walled bag, a quicker penetration of heat is obtained. After the beneficial effects of carbon dioxide in the initial cure are obtained, air can then be substituted without the usual oxidation results.

Having now described my invention, what I claim as new and useful and desire to secure by Letters Patent, is:

1. The method of vulcanizing articles of rubber which consists in introducing carbon dioxide into an expansible bag placed in contact with the article within a mold from a source of supply of considerably greater volume than the volume of said bag, the walls of which permit a penetration of the carbon dioxide to form a protecting envelope and then applying vulcanizing heat.

2. The method of vulcanizing articles of rubber which consists in introducing carbon dioxide into an expansible bag placed in contact with the article within a mold from a source of supply of considerably greater volume than the volume of said bag, permitting penetration of the carbon dioxide into said walls while maintaining said source of supply under a substantially constant pressure, applying vulcanizing heat, and maintaining said bag in communication with said source of supply during the application of vulcanizing heat to thereby maintain said bag inflated under constant pressure, and returning said carbon dioxide to said source of supply for reuse after the vulcanization is completed.

3. The process of curing or vulcanizing rubber articles which consists in introducing carbon dioxide into an expansible bag placed in contact with the article within a mold, applying vulcanizing heat and maintaining the bag in communication with the source of supply of carbon dioxide under pressure during the application of the vulcanizing heat, and then conducting one or more successive vulcanizing operations while such expansible bag contains a filling of air under pressure.

4. The method of vulcanizing or curing rubber articles which consists in introducing carbon dioxide into an expansible bag placed in contact with the article within a mold, applying vulcanizing heat, while maintaining a substantially constant pressure of carbon dioxide within said expansible bag, withdrawing the carbon dioxide from such bag after such curing operation, inflating such expansible bag with air and conducting one or more subsequent curing operations while said bag is inflated with air.

5. The method of vulcanizing articles of rubber which consists in introducing carbon dioxide into an expansible bag placed in contact with the article within a mold from a source of supply of considerably greater volume than the volume of said bag, the walls of which permit a penetration of the carbon dioxide to form a protecting envelope and then applying vulcanizing heat, and returning the unused carbon dioxide for reuse.

6. The method of vulcanizing or curing rubber articles which comprises supplying a thin walled rubber bag with carbon dioxide and placing said bag in contact with the article within a mold, applying vulcanizing heat and causing the carbon dioxide which penetrates the bag to act on the article to be cured.

In testimony whereof I have hereunto set my hand on this 26th day of May A. D. 1925.

HENRY R. MINOR.